(12) United States Patent
Sekiguchi et al.

(10) Patent No.: US 6,847,428 B1
(45) Date of Patent: Jan. 25, 2005

(54) CAMERA HAVING A LIQUID CRYSTAL DISPLAY DEVICE

(75) Inventors: Kanetaka Sekiguchi, Sayama (JP); Nobuyuki Hashimoto, Iruma (JP); Koichi Hoshino, Omiya (JP); Masami Kikuchi, Kodaira (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/926,803

(22) PCT Filed: Jun. 23, 2000

(86) PCT No.: PCT/JP00/04160

§ 371 (c)(1),
(2), (4) Date: Dec. 20, 2001

(87) PCT Pub. No.: WO00/79338

PCT Pub. Date: Dec. 28, 2000

(30) Foreign Application Priority Data

Jun. 23, 1999 (JP) .......................... 11/176380

(51) Int. Cl.$^7$ ................................ G02F 1/13
(52) U.S. Cl. .................... 349/139; 349/61; 396/296; 396/219; 396/232
(58) Field of Search .................. 349/61, 139, 62, 349/86, 153, 65, 151, 152, 149, 96; 354/53; 396/296, 219, 232; 348/333.01, 333.02

(56) References Cited

U.S. PATENT DOCUMENTS

| | | | | |
|---|---|---|---|---|
| 4,299,462 A | * | 11/1981 | Suzuki et al. ............... 396/279 |
| 5,099,343 A | * | 3/1992 | Margenum et al. ........... 359/48 |
| 5,877,835 A | * | 3/1999 | Dunn et al. ................. 349/182 |
| 5,926,243 A | * | 7/1999 | Kim .......................... 349/138 |
| 6,002,887 A | * | 12/1999 | Chiba et al. ................ 396/232 |
| 6,075,951 A | * | 6/2000 | Maruyama ................... 396/429 |
| 6,246,506 B1 | * | 6/2001 | Kobayashi et al. .......... 359/246 |
| 6,292,243 B1 | * | 9/2001 | Shingu et al. .............. 349/122 |
| 2001/0033349 A1 | * | 10/2001 | Honda et al. |

FOREIGN PATENT DOCUMENTS

| | | |
|---|---|---|
| JP | 53-94798 | 8/1978 |
| JP | 53-97457 | 8/1978 |
| JP | 64-3631 | 1/1989 |
| JP | 4-131893 | 5/1992 |
| JP | 10-253948 | 9/1998 |

\* cited by examiner

Primary Examiner—Kenneth Parker
Assistant Examiner—Thoi V. Duong
(74) Attorney, Agent, or Firm—Westerman, Hattori, Daniels & Adrian, LLP

(57) ABSTRACT

A liquid crystal display panel in which a signal electrode provided on a first substrate (1), a counter electrode provided on a second substrate (2), and a liquid crystal layer (18) between the substrates, and which carries out display without polarizers by changing the degree of transmission and scattering by means of a voltage applied to a pixel part. A light source part (27) is provided along the periphery of both substrates (1, 2), and a polarization separating device (30) is provided between the liquid crystal panel and the light source part (27).

18 Claims, 9 Drawing Sheets

CAMERA HAVING A LIQUID CRYSTAL DISPLAY DEVICE

BACKGROUND OF THE INVENTION

1. Field of the Invention

The present invention relates to a liquid crystal display device and, more specifically, to a liquid crystal display device in which almost the entire display area is brought into a transparent state for a condition behind it to be clearly viewed, so that only a specific pattern isolated in the display area is displayed in a scattering state.

Further, the invention specifically relates to a liquid crystal display device which is installed in a finder optical system of a camera to be suitable for displaying a target pattern for autofocus in a finder visual field.

2. Description of the Related Art

A liquid crystal display device using a liquid crystal display panel (LCD) has an advantage of thin-profile, light weight and, additionally, an extremely low power consumption, and thus it has been used as displays of wide-ranging devices including various kinds of portable electronic devices such as electronic calculators, cellular phones, wristwatches, cameras, video cameras, notebook personal computers, and the like.

In the liquid crystal display panel, a pair of transparent substrates are coupled together with a fixed gap provided therebetween with a sealing part provided around a display area, and the gap is filled with a liquid crystal layer to constitute a liquid crystal cell. Then, voltage is partially applied to the liquid crystal layer by a signal electrode and a counter electrode which are provided on opposed inner surfaces of the two substrates, thereby making it possible to change its optical characteristics (twist of a polarization axis, birefringence property, transmission/scattering, and the like).

Therefore, transmission/absorption or scattering of light, hue, and the like are different between a part where voltage is applied to the liquid crystal layer and a part with no voltage by combination with polarizers disposed on both sides of the liquid crystal cell or the liquid crystal cell itself, whereby various kinds of displays can be performed.

In such liquid crystal display devices, there are a transmission type and a reflection type or a reflection type with illumination. The transmission type liquid crystal display device has a light source part below the first substrate which is opposite to the visible side of the liquid crystal display panel. The reflection type liquid crystal display device has a light source part above the second substrate on the visible side of the liquid crystal display panel, or external light is incident thereon from the visible side.

In the case of the reflection type liquid crystal display device with illumination, a display, during a reflection display, is performed using a difference in strength of light which is made incident on the liquid crystal layer from the second substrate side and reflected from the liquid crystal layer side to go out again to the visible side, and a display similar to the transmission type liquid crystal display device is performed during a transmission display by turning on the light source part below the first substrate.

Further, in a liquid crystal display panel having a liquid crystal layer composed of a twisted nematic (TN) liquid crystal or a super twisted nematic (STN) liquid crystal sandwiched between the pair of transparent substrates, it is necessary to dispose polarizers on both sides thereof, which decreases the transmittance of light, resulting in a dark transmission display.

Accordingly, for example, when the liquid crystal display panel is used as a finder part of a camera, its finder visual field becomes dark in the case such liquid crystal display panel with polarizers is used, because of absorption by the polarizers.

Furthermore, when the environment where the camera is used is dark, the display of the target pattern or the like on the liquid crystal display panel cannot be viewed. If a light source part is therefore disposed on the first substrate side which is opposite to the visible side for illumination, the light from the light source part becomes noise to light from a photographing lens because light from a subject is incident through the photographing lens which is provided on the first substrate side, presenting a problem that the subject becomes difficult to be recognized by the observer.

The present invention is made to solve these problems, and its object is to bring almost the entire display area into a transmission state with high transparency without using a polarizer in the liquid crystal display panel, and to display only a specific pattern in the display area always clearly even when the background is bright or dark and to prevent the background from being hard to view.

SUMMARY OF THE INVENTION

A liquid crystal display device according to the present invention is a liquid crystal display device including a liquid crystal display panel in which a first substrate formed with a signal electrode and a second substrate formed with a counter electrode formed on one surface, respectively, are bonded together, with the signal electrode and the counter electrode opposed to each other, with a fixed gap therebetween provided by interposing a sealing part at an outer peripheral part of a display area, and a liquid crystal layer is provided in the gap, and is characterized by being structured as follows in order to achieve the above-described objects.

The signal electrode is composed of a surrounding electrode formed over almost the entire area of the display area, a pattern electrode isolatedly formed within the surrounding electrode, and a wiring electrode formed across the surrounding electrode with a gap provided between the wiring electrode and the surrounding electrode in order to selectively apply voltage to the pattern electrode.

Further, the counter electrode is provided over the entire area of the display area to face the signal electrode.

Furthermore, the first substrate and the second substrate and the signal electrode and the counter electrode are all transparent, and the liquid crystal layer is a scattering type liquid crystal layer which changes in transmittance and scattering rate depending on existence or absence of application of voltage by means of the signal electrode and the counter electrode, in which transparency increases in a part to which voltage is applied.

Moreover, a light source means which emits linearly polarized light is disposed outside a peripheral part of the liquid crystal display panel, and at least a part of the sealing part facing the light source means has a light transmitting property to allow linearly polarized light emitted from the light source means to pass through the sealing part and enter the liquid crystal layer.

Alternatively, it is also preferable that the signal electrode is composed of a pattern electrode isolatedly formed within the display area, and a wiring electrode formed across the display area in order to selectively apply voltage to the pattern electrode, and the counter electrode is provided only in an area to face the pattern electrode.

The liquid crystal layer in this case is a scattering type liquid crystal layer which changes in transmittance and scattering rate depending on existence or absence of application of voltage by means of the signal electrode and the counter electrode, in which a scattering degree increases in a part to which voltage is applied. The other structure may be the same as that of the above-described liquid crystal display device.

In these liquid crystal display devices, the liquid crystal display panel, in which an outside of the second substrate is a visible side, always presents a condition outside the first substrate to the visible side.

Further, it is preferable that a luminosity of a scattering part of the liquid crystal layer becomes higher than luminosities of other parts while a light source part of the light source means is turned on, and the luminosity of the scattering part of the liquid crystal layer becomes lower than the luminosities of the other parts while the light source part is turned off.

Furthermore, it is possible that the light source means is composed of a light source part and a polarization separating device disposed between the light source part and an outer peripheral part of the liquid crystal display panel.

It is more desirable that an optical means composed of a convex lens or a diffuser is provided between the light source part and the polarization separating device in the light source means.

In this case, it is most preferable that the scattering type liquid crystal layer of the liquid crystal display panel is a mixed liquid crystal layer composed of transparent solid substances and liquid crystal, which is produced by applying ultraviolet light to liquid composed of the liquid crystal and organic monomers, and the polarization separating device is disposed so that a transmission axis thereof almost matches with a direction in which a difference between a refractive index of the transparent solid substance and a refractive index of the liquid crystal of the mixed liquid crystal layer is small.

The scattering type liquid crystal layer may also be a mixed liquid crystal layer composed of transparent solid substances having alignment properties and liquid crystal, which is produced by applying ultraviolet light to liquid made by mixing liquid crystal polymers into the liquid crystal and organic monomers.

As the polarization separating device, an absorption type polarizer having a transmission axis and an absorption axis substantially perpendicular to the transmission axis, or a reflection type polarizer having a transmission axis and a reflection axis substantially perpendicular to the transmission axis can be used.

When the polarization separating device is a reflection type polarizer, it is preferable that a diffuser is provided between the polarization separating device and the light source part, and a reflector is provided around the light source part.

It is also preferable that, as the polarization separating device, the absorption type polarizer is disposed on the liquid crystal display panel side and the reflection type polarizer is disposed on the light source side respectively with directions of the transmission axes of the absorption type polarizer and the reflection type polarizer matching with each other.

Further, it is preferable that light intensity change means which controls increase and decrease of an intensity of light to make incident on the liquid crystal display panel in accordance with an intensity of light incident on the liquid crystal display panel from outside the first substrate is provided in the light source means. The light intensity change means may manually or automatically control voltage or electric current applied to the light source part to change its light emission strength or light emission period.

It is also possible that the light intensity change means is composed of a liquid crystal cell provided between the polarization separating device and the light source part, a polarizer arranged on a light source part side of the liquid crystal cell, an exposure meter for detecting the intensity of the light incident from outside the first substrate, and a liquid crystal driving circuit for changing voltage applied to the liquid crystal cell in accordance with an output from the exposure meter, so that a transmittance of the liquid crystal shutter composed of the liquid crystal cell, and the polarization separating device and the polarizer on either side of the liquid crystal cell is controlled to change the intensity of the light to make incident on the liquid crystal display panel.

It is desirable that an ultraviolet cutting layer is provided at least on one of outer surfaces of the first and second substrates of the liquid crystal display panel.

It is preferable that an anti-reflection layer for preventing reflection of light within a wavelength range of light emitted by the light source part is provided on outer surfaces of at least one of the first and second substrates of the liquid crystal display panel.

The light source part preferably emits light with an optical wavelength in a range from 380 nanometers (nm) to 800 nanometers (nm). Further, a plurality of light source parts are arranged outside the peripheral part of the liquid crystal display panel, thereby obtaining more sufficient intensity of light. It is also possible that, as the plurality of light source parts, light source parts for emitting light in different wavelength regions (emitted light colors) are provided, or a plurality of light emitting elements for emitting light in different wavelength regions are provided in one light source part. They may be selectively used.

It is possible that the liquid crystal display device in the explanations is constituted as a module to be installed in a finder optical system of a camera, and the pattern electrode of the liquid crystal display panel is an electrode for displaying an autofocus target pattern.

In this case, it is preferable that a finder screen is disposed outside the first substrate and a finder lens is disposed outside the second substrate of the liquid crystal display panel respectively.

In the liquid crystal display device according to the invention, almost the entire display area of the liquid crystal display panel can be brought into the transmission state for a condition behind the first substrate to be always viewed clearly. The employment of the scattering type liquid crystal layer as the liquid crystal layer enables a display without using a polarizer, so that the transmittance of the liquid crystal display panel is improved to enhance the visibility of the background. Further, it is possible that only a part of the liquid crystal layer sandwiched between the pattern electrode and the counter electrode is brought into the scattering state, so that when the background is bright, a dark pattern is displayed therein, and when the background is dark, a bright pattern is displayed by turning on the light source part. In this event, the collimate lens is provided between the outer peripheral part of the liquid crystal display panel and the light source part to make the light from the light source part a ray parallel to the first substrate and the second substrate of the liquid crystal display panel and to let it enter the liquid crystal layer, whereby the light scattered or reflected in the transparent part of the liquid crystal layer to go out to the visible side decreases, so that only the pattern in the scattering part is displayed bright without difficulty in viewing the background.

The polarization separating device is provided between the outer peripheral part of the liquid crystal display panel and the light source part, the scattering type liquid crystal layer of the liquid crystal display panel is the mixed liquid crystal layer composed of the transparent solid substances and the liquid crystal, which is produced by applying ultraviolet light to the liquid composed of the liquid crystal and the organic monomers, and the polarization separating device is disposed so that the transmission axis thereof almost matches with the direction in which the difference between the refractive index of the transparent solid substance and the refractive index of the liquid crystal of the mixed liquid crystal layer is small. Thereby, the light from the light source part passes through the polarization separating device to be linearly polarized, and the direction of the polarized light is in the direction in which the difference in refractive index between the transparent solid substance and the liquid crystal is small, so that the incident light from the light source part passes through, without scattered, the transmission part of the liquid crystal layer and is scattered only in the scattering part to realize a display of a bright pattern.

Almost the entire liquid crystal display panel other than the pattern display part is brought into the transparent state, whereby the incident light from the light source part (side light) disposed around the liquid crystal display panel can be introduced to the entire display area through use of the reflection due to the difference in refractive index between the first substrate and the air layer, and the reflection due to the difference in refractive index between the second substrate and the air layer.

Further, the intensity of light of the light source part which reaches the liquid crystal display panel decreases in the case where the polarization separating device is simply disposed between the liquid crystal display panel and the light source part as compared to the case where the polarization separating device is not provided. Therefore, the reflection type polarizer is used as the polarization separating device to emit a linearly polarized light to the liquid crystal layer, and the component reflected toward the light source part is returned again to the reflection type polarizer, by cancelling its polarization and reflecting by the reflector, thereby improving the efficiency of emitting light.

When the strength of the light incident from outside the first substrate constituting the liquid crystal display panel is low, the light from the light source part (side light) provided around the liquid crystal display panel is slightly reflected toward the observer from the transparent part of the liquid crystal display panel to interfere the visibility of the back of the first substrate, and thus it is better to decrease the intensity of the light (brightness) from the light source part by the light intensity change means.

DETAILED DESCRIPTION OF THE PREFERRED EMBODIMENTS

Hereinafter, the present invention will be explained with reference to the accompanying drawings.

First embodiment: FIG. 1 to FIG. 9

First, the first embodiment of a liquid crystal display device according to the invention is explained with reference to FIG. 1 to FIG. 9.

Figure 1:
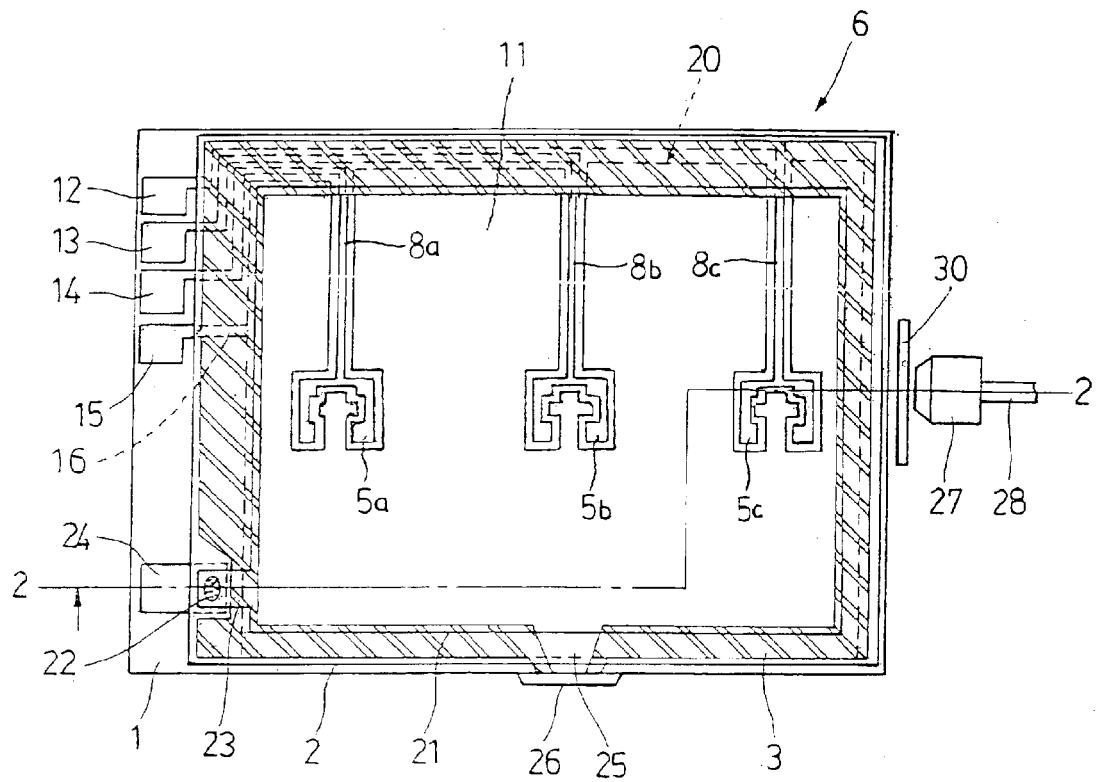
FIG. 1 is a plane view showing a first embodiment of a liquid crystal display device according to the invention.
Figure 2:
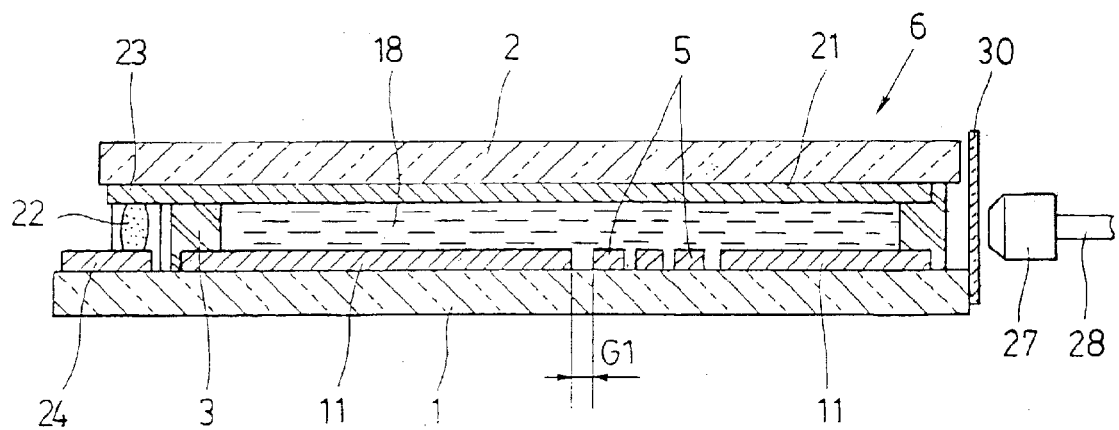
FIG. 2 is a schematic cross-sectional view taken along a line 2—2 in FIG. 1.
Figure 3:
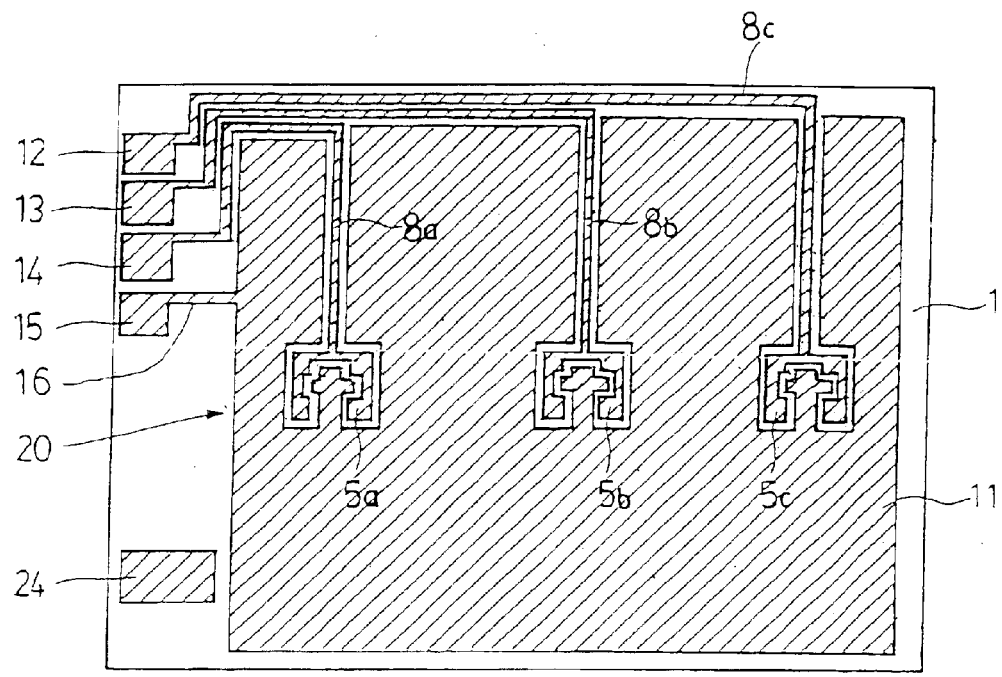
FIG. 3 is a plane view of a first substrate formed with a signal electrode on the upper surface in FIG. 1.
Figure 4:
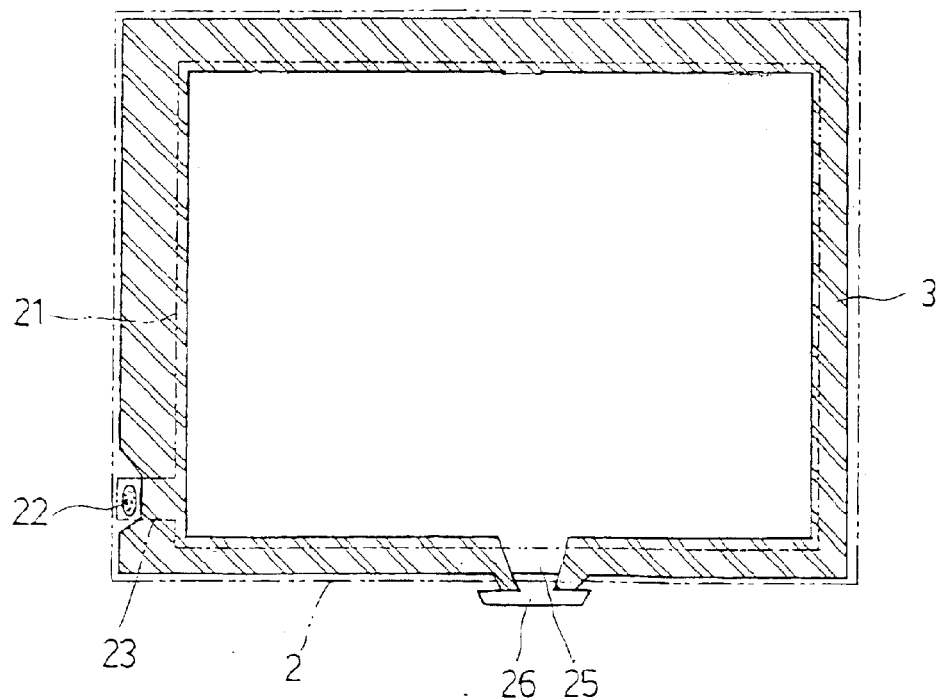
FIG. 4 is a plane view of a sealing part provided between the first substrate and a second substrate in FIG. 1.
Figure 5:
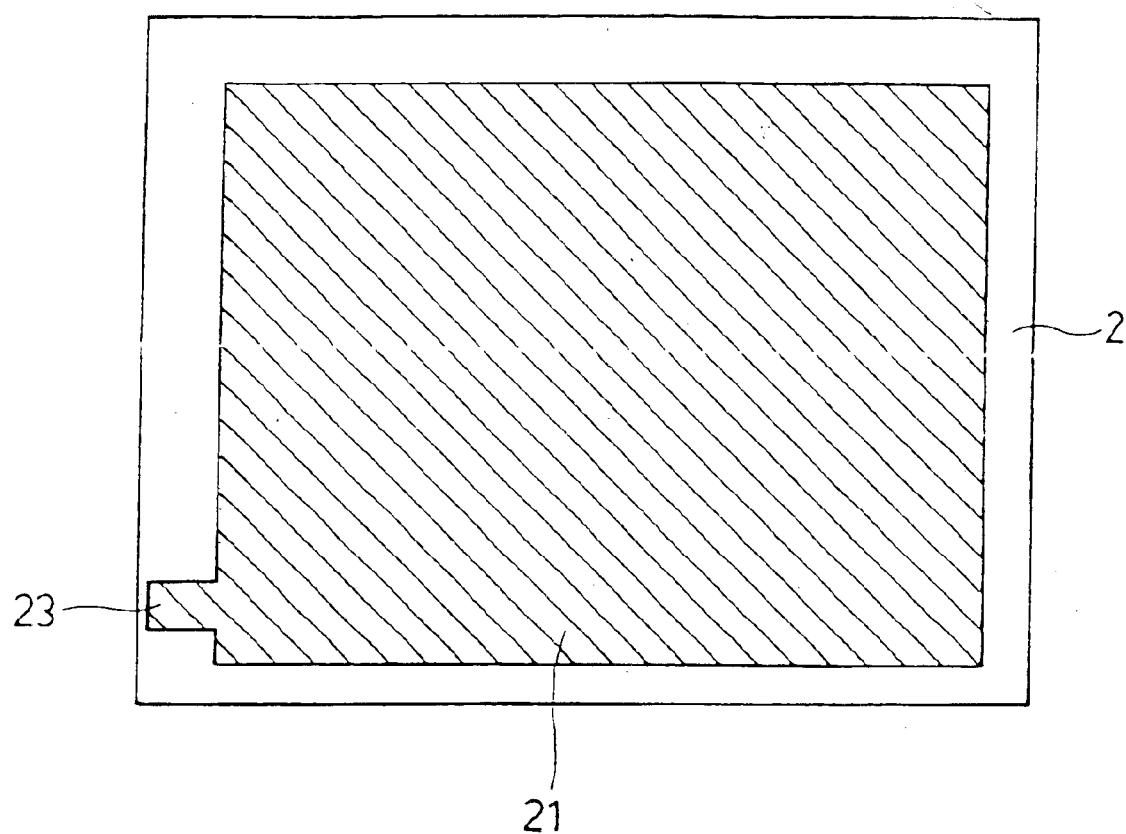
FIG. 5 is a plane view of the second substrate formed with a counter electrode on the lower surface in FIG. 1.

FIG. 1 is a plane view of a liquid crystal display panel and a light source part of the liquid crystal display device, FIG. 2 is a schematic cross-sectional view taken along a line 2—2 in FIG. 1, FIG. 3 is a plane view of a first substrate formed with a signal electrode on the upper surface thereof, FIG. 4 is a plane view of a sealing part provided between the first substrate and a second substrate, and FIG. 5 is a plane view of the second substrate formed with a counter electrode on the lower surface thereof.

With these drawings, the structure of the liquid crystal display panel of this embodiment is explained first.

In a liquid crystal display panel 6, as shown in FIG. 1 and FIG. 2, a first substrate 1 formed with a signal electrode 20 and a second substrate 2 formed with a counter electrode 21 on one surface, respectively, are coupled together, with the signal electrode 20 and the counter electrode 21 opposed to each other, with a fixed gap therebetween provided by interposing a sealing part 3 at the outer peripheral part of a display area, and the gap is filled with a liquid crystal layer 18.

The signal electrode 20 is composed of a surrounding electrode 11 formed over almost the whole display area on the inner surface of the first substrate 1, target electrodes 5a, 5b and 5c which are pattern electrodes isolatedly formed within the surrounding electrode 11, and wiring electrodes 8a, 8b and 8c which are formed across the surrounding electrode 11 with gaps G1 (FIG. 2) provided between they and the surrounding electrode 11 in order to selectively apply voltage to each of the target electrodes.

The counter electrode 21 is provided over the whole display area on the inner surface of the second substrate 2 to face the signal electrode 20.

The first substrate is a transparent glass substrate and provided, on its one surface (upper surface in the drawing), with the surrounding electrode 11 formed over almost the whole display area, the three target electrodes 5a, 5b and 5c isolatedly formed within the surrounding electrode 11 to form target pattern forms for automatic focus (autofocus), and the wiring electrodes 8a, 8b and 8c connected to the respective target electrodes 5a, 5b and 5c, as the signal electrode 20 made of an indium tin oxide (ITO) film that is a transparent conductive film as shown in FIG. 3.

In the vicinity of one side on the first substrate, three connecting electrodes 12, 13 and 14 for the target electrodes and a connecting electrode 15 for the surrounding electrode are provided in a row. Further, a connecting electrode 24 for the counter electrode on the second substrate is also provided. These connecting electrodes are all also made of the same ITO film as that of the signal electrode 20.

The three target electrodes 5a, 5b and 5c are connected to the respective connecting electrodes 12, 13 and 14 by the wiring electrodes 8a, 8b, and 8c crossing the surrounding electrode 11 respectively, and the surrounding electrode 11, is connected to the connecting electrode 15 for the surrounding electrode by a surrounding electrode wiring electrode 16.

Between each of the target electrodes 5a, 5b and 5c and wiring electrodes 8a, 8b and 8c, and, the surrounding electrode 11, the gap G1 is respectively provided as shown in FIG. 2. This gap is preferably made about 3 micrometers ($\mu$m) because the smaller the gap, the more inconspicuous and the better. The wiring electrodes 8a, 8b and 8c are preferably also made to have a width of about 3 $\mu$m so as to be inconspicuous.

Further, the second substrate 2 which is opposed to the first substrate 1 with a gap of 7 micrometers ($\mu$m) to 10 micrometers ($\mu$m) is also a transparent glass substrate, and is provided, on its one surface (lower surface in the drawing), with the counter electrode 21 made of an ITO film over the entire surface of the display area as shown in FIG. 5. This counter electrode 21 is also formed with a wiring electrode 23.

To oppose the first substrate 1 and the second substrate 2 with the fixed gap provided therebetween, spacers, not shown, made of plastic are interposed in the gap, and the substrates are coupled together as shown in FIG. 2 by the sealing part 3, which is composed of a transparent sealing material provided at the outer peripheral part of the display area, as clearly shown in FIG. 4.

This makes each of the target electrodes 5a, 5b and 5c, and the surrounding electrode 11 on the first substrate 1, and, the counter electrode 21 on the second substrate 2 oppose each other with a predetermined gap therebetween.

A closing part 25 is provided at a part of the sealing part 3, and liquid crystal is introduced through this closing part 25 and closed with a closing material 26, thereby filling the gap between the first substrate 1 and the second substrate 2 with the liquid crystal layer 18.

This makes each of the target electrodes 5a, 5b and 5c (only the target electrode 5c is shown in FIG. 2) and the surrounding electrode 11 on the first substrate 1, and, the counter electrode 21 on the second substrate 2 oppose each other with the liquid crystal layer 18 sandwiched therebetween.

To enable connection of the counter electrode 21 to an external circuit (not shown), its wiring electrode 23 is electrically connected to the counter electrode connecting electrode 24 provided on the first substrate 1 by an anisotropic conductive sealing material 22 made by mixing conductive particles in an adhesive.

The liquid crystal layer 18 is a mixed liquid crystal layer made by injecting a precursor of a mixed liquid crystal containing organic monomers in a liquid crystal into the gap between the first substrate 1 and the second substrate 2 through the end-closing part 25 of the outer peripheral sealing part 3, closing it with the closing material 26, and then applying ultraviolet light thereto from the outside to make the organic monomers to organic polymers to thereby disperse transparent solid substances in the liquid crystal.

The liquid crystal layer 18 composed of the mixed liquid crystal layer is a scattering type liquid crystal layer whose transmittance and scattering rate change depending on existence or absence of application of voltage by means of the signal electrode 20 and the counter electrode 21, in which the transparency (transmittance) increases in a part to which voltage is applied.

The overlap between the target electrode 5 (hereinafter, 5a, 5b and 5c are all referred to as 5 without distinction) and the counter electrode 21 of this liquid crystal display panel 6 constitutes a pixel part forming a display pattern, and by applying voltage between the target electrodes 5 and the surrounding electrode 11, and, the counter electrode 21, directions of liquid crystal molecules are aligned with a direction of an electric field in the whole area of the liquid crystal layer 18 to increase the transmittance, which can bring almost the entire display area into a transparent state.

Further, the voltage applied to the target electrodes 5 is turned off to bring parts of the liquid crystal layer 18 on the target electrodes 5 into a scattering state, thereby displaying target patterns.

In this case, parts of the liquid crystal layer 18 facing the wiring electrodes 8a, 8b and 8c, and the gaps between them and the surrounding electrode 11 are also brought into a scattering state, but they are hardly recognized in the state because widths of the gap G1 and the wiring electrodes 8a, 8b, and 8c are small, 3 micrometers ($\mu$m), respectively.

The employment of the above-described structure makes it possible to bring only the part of the liquid crystal layer 18 facing the target electrode 5 into the scattering state to display the target pattern.

Figure 6:
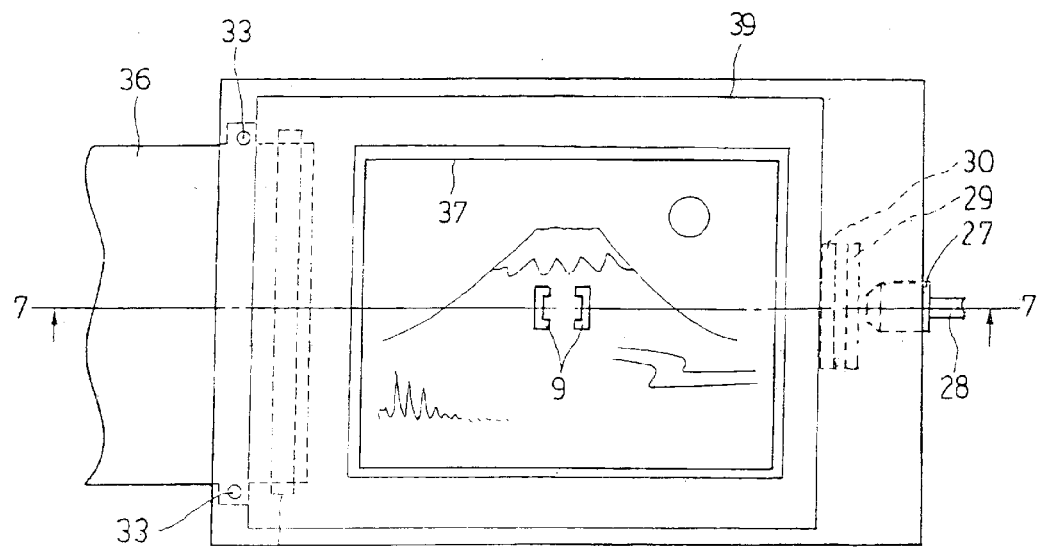
FIG. 6 is a plane view of a camera module in which the liquid crystal display device of the first embodiment is installed.
Figure 7:
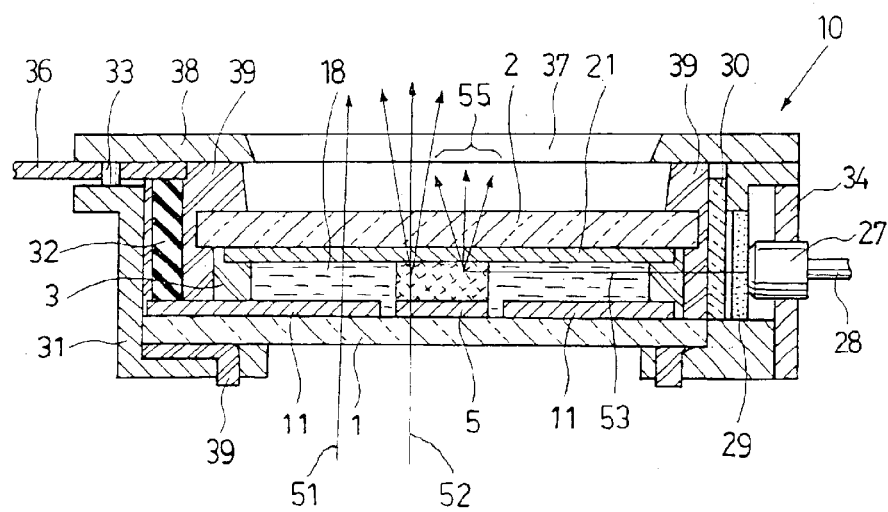
FIG. 7 is a schematic cross-sectional view taken along a line 7—7 in FIG. 6.

FIG. 6 is a plane view of a camera module in which this liquid crystal display device is installed, showing a state in which only an autofocus target pattern 9 produced by the center target electrode 5 among the three target electrodes is displayed within a display frame 37 together with a background (subject) image which is recognized in a transparent display area. FIG. 7 is a schematic cross-sectional view taken along a line 7—7 in FIG. 6. Incidentally, in FIG. 7, the target electrode 5 is shown not as a pair of small electrodes but as one relatively large electrode for convenience of explanation.

A large voltage is applied between other target electrodes 5 and the surrounding electrode 11, and, the counter electrode 21 to make a state in which only the center target pattern 9 can be recognized. In this state, the focus can be adjusted in the center target pattern 9.

As shown in these drawings, the liquid crystal display panel 6 is set in a panel holding frame 31, and the connecting electrodes 12, 13, 14, 15 and 24 on the first substrate 1 are electrically connected to respective wires of a flexible print circuit board (FPC) 36 through a zebra rubber connector 32. To position the FPC 36, a positioning pin 33 is provided on the panel holding frame 31.

Further, to establish connection between the zebra rubber connector 32 and the FPC 36, a panel fixing frame 38 is provided. The panel fixing frame 38 is provided with the display window 37 at a part corresponding to the display area of the liquid crystal display panel.

Furthermore, to prevent the liquid crystal display panel from a rapid change in temperature due to a change in environment, a heat insulating seal 39 made of a silicon resin is filled in a gap between the panel holding frame 31 and the panel fixing frame 38. The heat insulating seal 39 also fixes the panel holding frame 31 and the panel fixing frame 38.

Further, when light from the subject is dim, it is difficult for an observer to recognize the target pattern 9. Therefore, a light source part (side light) 27 composed of a light emitting diode (LED) device for emitting red light is provided outside the periphery of the liquid crystal display panel 6 (at the light-band side in this embodiment).

The light source part 27 is provided with a light source part electrode 28 for applying a predetermined signal to the light source part 27. Further, the light source part 27 is fixed to the panel holding frame 31 by a light source part holding part 34.

Moreover, between the light source part 27 and the liquid crystal display panel, a polarization separating device 30 shown in FIG. 1 and FIG. 2 is provided. Furthermore, optical means 29, whose illustration is omitted in FIG. 1 and FIG. 2, for letting the light of the light source part 27 uniformly enter the entire surface of the liquid crystal display panel 6 is provided between the polarization separating device 30 and the light source part 27. The optical means 29 is a convex lens (functioning as a collimator lens) whose one side facing the liquid crystal display panel forms a convex spherical surface, or a diffuser. In FIG. 7, it is shown as a diffuser.

As the polarization separating device 30, an absorption type polarizer is employed which has a transmission axis and an absorption axis substantially perpendicular to the transmission axis as polarization axes.

A ray emitted from the light source part 27 is finally made a linearly polarized light by the polarization separating device 30 to enter the liquid crystal layer 18 of the liquid crystal display panel 6. In order to propagate the light to the liquid crystal layer 18 without, as much as possible, cancellation of polarization, at least a part of the sealing part 3 of the liquid crystal display panel, on which the light from the light source part 27 is incident, is preferably made of a transparent sealing material having no scattering property.

With the above-described structure, the light from the light source part 27 is made light at a predetermined angle by the optical means 29 as shown in FIG. 7 to enter the polarization separating device 30.

The light is made a linearly polarized light by the polarization separating device 30 to be emitted toward the first substrate 1, the second substrate 2, and the liquid crystal layer 18 which constitute the liquid crystal display panel. The light is repeatedly reflected by the inner surfaces of the first substrate 1 and the second substrate 2 due to a difference in refractive index between the first substrate 1 and the second substrate 2, and, an air layer (not shown) to be allowed to enter the entire liquid crystal layer 18 of the a liquid crystal display panel 6.

An incident light 53 from the light source part 27 shown in FIG. 7 is illustrated representing light components which are incident from the polarization separating device 30 directly on the liquid crystal layer 18. The liquid crystal layer 18 is in the transparent state in a part of the liquid crystal layer 18 other than the part (target part) on the target electrode 5 to which voltage is not applied, and thus the light passes, without scattered, through the former part to hardly go out toward the observer.

The liquid crystal layer 18 is scattered on the target electrode 5 to which voltage is not applied, which makes it possible to emit a scattered light 55 in various directions as shown in FIG. 7 and to emit it toward the observer. The scattered light 55 in FIG. 7 is shown representing the scattered light toward the observer.

As for incident light from behind the first substrate 1 of the liquid crystal display panel, an incident light 51 goes out to the visible side as it is in a part where the liquid crystal layer 18 is not in the scattering state (in the transparent state). An incident light 52 into the part on the target electrode 5 where the liquid crystal layer 18 is scattered is scattered by the liquid crystal layer 18 to go out to the visible side.

More specifically, among the subject incident light 51 and the subject incident light 52 from below (lens side of) the first substrate 1, the subject incident light 52 is scattered by the liquid crystal layer 18 on the target electrode 5 and thus recognized as dark by the observer, and the subject incident light 51 is recognized as bright because the liquid crystal layer 18 is substantially transparent.

Therefore, it becomes possible to display the target pattern dark in a picture of a bright subject. In this case, there is no layer for absorbing light such as a polarizer in a direction of the subject incident lights 51 and 52, so that the observer can recognize the bright subject.

Figure 8:
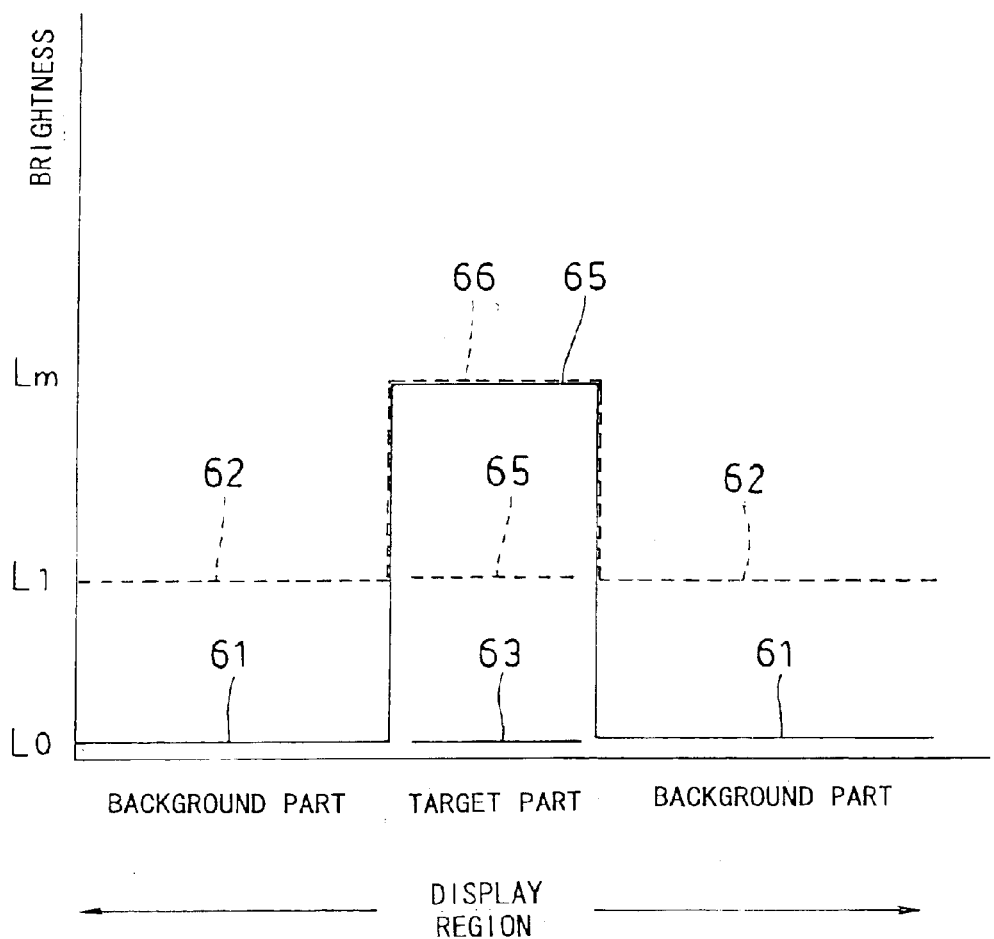
FIG. 8 is a chart showing characteristics of the liquid crystal display device according to the invention.

The brightnesses of the target part (part corresponding to the target electrode 5) in the scattering state and the background part (part corresponding to the surrounding electrode 11) in the transmission state when the light source part 27 is turned on, which the observer recognizes, are explained using FIG. 8. The horizontal axis in FIG. 8 indicates the position in the display area of the liquid crystal display panel, and the vertical axis indicates the brightness.

Since the polarization separating device 30 is provided between the light source part 27 and the liquid crystal display panel 6 in the first embodiment of the invention, the brightnesses of the background part where the liquid crystal layer 18 is in the transparent state and the target part where voltage is applied to the target electrode 5 are at an extremely low level L0 as shown by solid lines 61 and 63 because of only a very low scattering property.

In contrast to this, the brightness of the target part where voltage is not applied to the target electrode 5 and thus the liquid crystal layer 18 is in the scattering state is at a high level Lm as shown by a solid line 64 because of its scattering property. Since the subject can not be recognized at the background part which is brighter than the light from the subject, it is preferable that the brightness level L0 at the background part is as low as possible and the brightness level Lm at the target part is moderately high.

Therefore, it is preferable to provide a light intensity change function for changing the intensity of light of the light source part 27 in accordance with the environment where the liquid crystal display device is used. In this embodiment, electric power applied to the light source part 27 is changed manually or automatically in accordance with the intensity of light incident from behind the first substrate 1 of the liquid crystal display panel, thereby changing the intensity of irradiation light thereof. The brightness L1 and broken lines 62 and 65 shown in FIG. 8 will be used for the explanation of a second embodiment.

Figure 9:
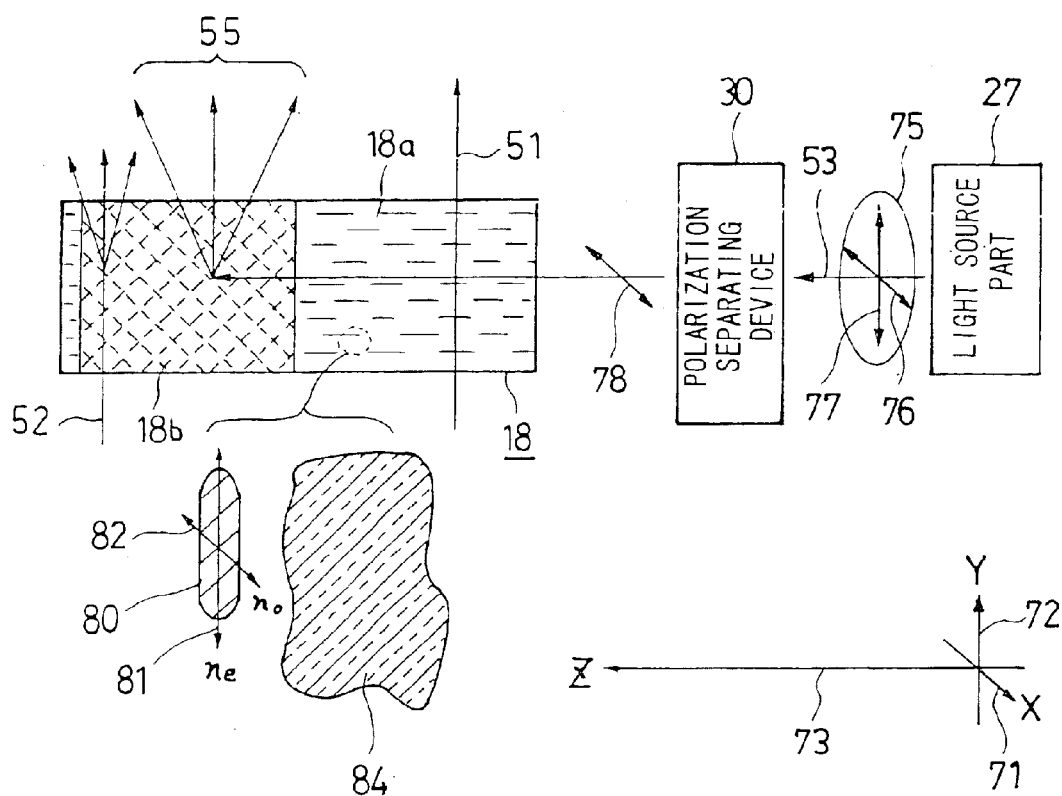
FIG. 9 is an explanatory view for explaining the display principle of the liquid crystal display device according to the first embodiment of the invention.

Next, the effectiveness of the invention is explained using FIG. 9.

The liquid crystal layer 18 is composed of schematically bar-shaped liquid crystal molecules 80 and transparent solid substances 84 each having a schematically porous body made of an acrylic resin existing around the liquid crystal molecules 80. Further, the transparent part is designated by 18*a*, and the scattering part (target part) is designated by 18*b*.

The liquid crystal molecule 80 has a refractive index ne (its direction is assumed to be 81) corresponding to extraordinary light, and a refractive index no (its direction is assumed to be 82) corresponding to ordinary light. The transparent state and the scattering state of the liquid crystal layer (mixed liquid crystal layer) 18 are generated by a differential between a refractive index np of the transparent solid substance 84 and the refractive index no or ne of the liquid crystal molecule 80, and alignment properties of the liquid crystal molecules (directions and ununiformity of the liquid crystal molecules 80).

In this embodiment, PNM-157 mixed liquid crystal manufactured by Dainippon Ink and Chemicals, Inc. is used as a raw material of the liquid crystal layer 18. The gap between the first and second substrates is filled with the mixed liquid crystal, and then the mixed liquid crystal is irradiated with ultraviolet light having a wavelength of 360 nanometers (nm) or longer for 60 seconds at a strength of 30 mW/cm$^2$ to produce a mixed liquid crystal layer composed of the transparent solid substances 84 and the liquid crystal molecules 80. As for the refractive indices of the liquid crystal layer 18, no=1.5 and ne=1.7, and the refractive index np of the transparent solid substance 84 is about 1.5. Accordingly, np≈no.

When the applied voltage is small, the liquid crystal molecules 80 point in various directions with respect to the transparent solid substances 84 because of a small compelling force on the directions of the liquid crystal molecules 80. More specifically, the liquid crystal molecules 80 are arranged at random because of low alignment properties to generate interface reflection between ne of the liquid crystal molecule and np of the transparent solid substance to the incident light. Therefore, a plurality of micro interface reflections are generated between the liquid crystal molecules 80 and the transparent solid substances 84, resulting in the scattering state. Accordingly, the subject incident light 52 is scattered to be a weak outgoing light toward the observer.

When the applied voltage is large, the long axes (directions 81 of ne) of the liquid crystal molecules 80 point in a direction from the first substrate 1 to the second substrate 2 because a compelling force with a strong electric field is exerted on the directions of the liquid crystal molecules 80.

Since the incident light from the first substrate 1 side is a circularly polarized light in a direction parallel to the direction of the refractive index no of the liquid crystal molecule 80 (the direction in which the refractive index of the liquid crystal molecule 80 is no), the difference in refractive index at the interface between the transparent solid substance 84 and the liquid crystal molecule 80 is small, and thus the interface reflection is hardly generated, resulting in the transmission state. Therefore, the subject incident light 51 is hardly scattered to be emitted with an original strength of the subject incident light 51 toward the observer.

In FIG. 9, the figure is illustrated assuming that the front-rear direction is an X-axis 71, the vertical direction is a Y-axis 72, and the horizontal direction is a Z-axis 73 with respect to the paper surface. However, the X-axis is difficult to recognize in the vertical direction with respect to the paper surface, and thus it is shown by an arrow having an angle of 45°.

The emitted light 53 from the light source part 27 is a circularly polarized light 75 with little polarization. The representative components of the circularly polarized light 75 are assumed to be an X-axis direction polarized light component (first polarized light component) 76 and a Y-axis direction polarized light component (second polarized light component) 77. The polarization separating device 30 has a transmission axis in the X-axis direction and an absorption axis in the Y-axis direction. Therefore, the emitted light from the polarization separating device 30 becomes a linearly polarized light 78 in the X-axis direction.

In the transparent part 18*a* of the liquid crystal layer 18, the liquid crystal molecule 80 has the refractive index ne in the direction from the first substrate toward the second substrate and the refractive index no in a direction perpendicular to ne. Accordingly, when a polarized light parallel to the direction of the refractive index no is made incident, reflection on the interface between the transparent solid substance 84 and the liquid crystal molecule 80 is hardly generated because of a small difference between the refractive index no and the refractive index np of the transparent solid substance 84, which hardly generates scattering.

Further, in the scattering part 18*b*, since the liquid crystal molecules 80 point in random directions, the linearly polarized light 78 is also scattered to become the scattered light 55 and goes out to the visible side, which the observer can recognize.

In other words, the polarization separating device 30 is preferably disposed so that its transmission axis is in the direction (X-axis direction) parallel to the direction of the refractive index no of the liquid crystal molecule 80.

With the above-described arrangement, the emitted light from the polarization separating device 30 is hardly scattered in the transparent part (background part) 18*a* of the liquid crystal layer 18 and is scattered only in the target part of the scattering part 18*b* to be recognized by the observer, which makes it possible for the observer to recognize the subject incident light 51.

Figure 10:
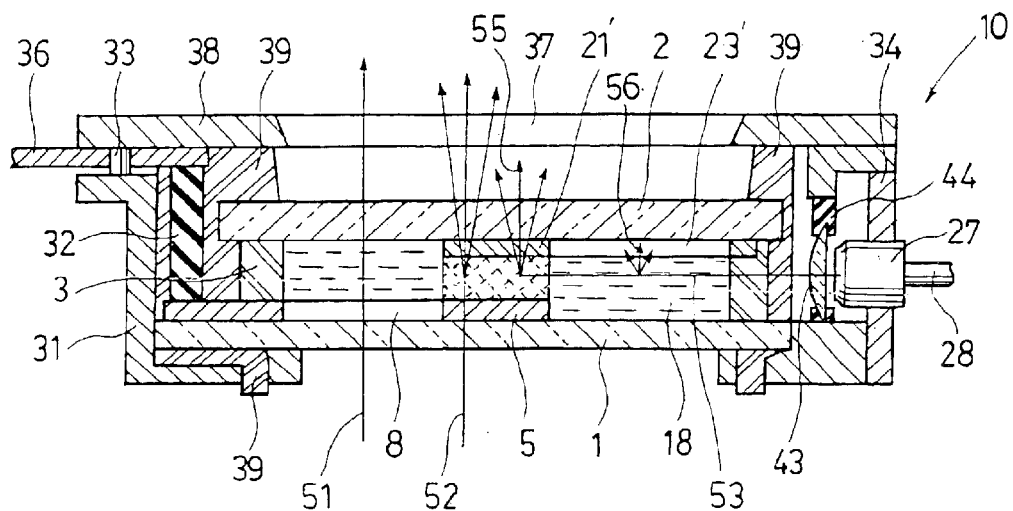
FIG. 10 is a schematic cross-sectional view, similar to FIG. 7, of a camera module showing a second embodiment of the liquid crystal display device according to the invention.
Figure 11:
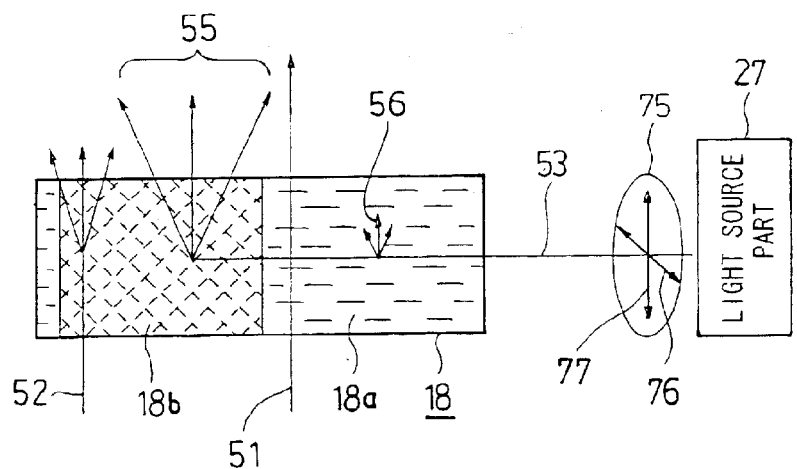
FIG. 11 is an explanatory view for explaining the display principle of the liquid crystal display device according to the second embodiment of the invention.
Figure 11:
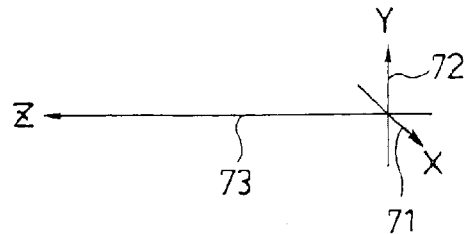

Second embodiment: FIG. 10, FIG. 11 and FIG. 8

Next, the second embodiment of the liquid crystal display device according to the invention is explained with reference to FIG. 10, FIG. 11 and FIG. 8.

FIG. 10 is a schematic cross-sectional view, similar to FIG. 7, of a camera module in which the liquid crystal display device is installed, in which the same portions as those in FIG. 7 are assigned the same numerals and the explanation thereof is omitted.

On a first transparent substrate 1, an isolated target electrode 5 for displaying an autofocus target pattern and a wiring electrode 8 for applying voltage thereto are provided as a signal electrode made of an indium tin oxide (ITO) film that is a transparent conductive film. The shapes and arrangement thereof are the same as those of the first embodiment but no surrounding electrode 11 is provided.

Further, on a second substrate 2 which is opposed to the first substrate 1 with a distance of 10 micrometers ($\mu$m) provided therebetween, a counter electrode 21' is provided only in an area opposed to the target pattern 5 on the first substrate 1, and its wiring electrode 23' is provided not to cross the wiring electrode 8 of the target electrode 5. The counter electrode 21' is connected to a counter electrode connecting electrode (not shown) provided on the first substrate 1 by an anisotropy conductive sealing material made by mixing conductive particles in an adhesive in order to enable connection to an external circuit (not shown).

The counter electrode 21' has almost the same area as that of the target electrode 5 on the first substrate 1, and further is connected to the counter electrode connecting electrode by carrying out wiring using a position different from that of the wiring electrode 8 on the first substrate 1. This is because if this wiring crosses the wiring electrode 8 of the target electrode 5 in a plane view, voltage is applied to a liquid crystal layer 18 at a part other than the target part.

The liquid crystal layer 18 used in this embodiment is made by injecting a precursor of a mixed liquid crystal layer containing organic monomers in a liquid crystal, and then applying ultraviolet light thereto to convert the organic monomers into organic polymers, thereby forming transparent solid substances in the liquid crystal to form the mixed liquid crystal layer 18. The organic monomers are mixed with liquid crystal polymers to form transparent solid substances having alignment properties by application of ultraviolet light.

Accordingly, the liquid crystal is aligned, and thus the liquid crystal layer 18 has transparency where no voltage is applied thereto.

Further, in this embodiment, between the liquid crystal display panel and a light source part 27, the polarization separating device 30 is not provided, but a collimate lens (convex lens) 43 for making light from the light source part 27 a ray parallel to the first substrate 1 and the second substrate 2 of the liquid crystal display panel is provided held in a panel holding frame 31 by a holding member 44.

In this liquid crystal display device, the overlap between the target electrode 5 and the counter electrode 21' is a pixel part for displaying a target pattern. By applying voltage between the target electrode 5 and the counter electrode 21', the alignment property of the liquid crystal layer is disordered, so that the difference in refractive index between the transparent solid substance and the liquid crystal molecule is used to make the scattering state. Further, by turning off the voltage to the target electrode 5, the entire display area is turned into the transmission state.

Employment of the above-described structure makes it possible to bring only the part of the liquid crystal layer 18 corresponding to the target electrode 5 into the scattering state.

As shown in FIG. 10, among a subject incident light 51 and a subject incident light 52 from below (lens side of) the first substrate 1, the subject incident light 52 is scattered by the liquid crystal layer 18 on the target electrode 5 and recognized as dark by the observer. The subject incident light 51 passes, as it is, through the liquid crystal layer 18 because it is substantially transparent, to be recognized as bright.

Accordingly, it becomes possible to display the target pattern dark in a picture of a bright subject. In this case, there is no layer for absorbing light such as a polarizer in a direction of the subject incident lights 51 and 52, and thus the observer can recognize the bright subject.

Next, operations when the light source part 27 is turned on are explained.

In this embodiment, the polarization separating device is not provided near the liquid crystal display panel in order to simplify the structure of the liquid crystal display device. Thus, as shown in FIG. 10, the light from the light source part 27 passes through the collimate lens 43 to become a luminous flux parallel to the first and second substrates 1 and 2 to enter the first substrate 1, the second substrate 2 and the liquid crystal layer 18 which constitute the liquid crystal display panel.

The incident light is repeatedly reflected due to the difference in refractive index between the first substrate 1 or the second substrate 2, and, the air layer, whereby the light can be made incident on the entire liquid crystal display panel.

The incident light 53 in FIG. 10 is illustrated representing light components which are incident directly on the liquid crystal layer 18. At the transparent part, the incident light 53 slightly goes out toward the observer as a scattered light 56 due to slight scattering by the liquid crystal layer 18.

The liquid crystal layer 18 is scattered on the target electrode 5, and thus the scattered light 55 can be emitted in various directions toward the observer as shown in FIG. 10.

The brightnesses of the target part in the scattering state and the background part in the transmission state when the light source part 27 is turned on, which the observer recognizes, are explained using FIG. 8. The horizontal axis indicates the position in the display area of the liquid crystal display panel, and the vertical axis indicates the brightness.

Since the polarization separating device is not provided between the light source part 27 and the liquid crystal display panel in the second embodiment, the background part where the liquid crystal layer 18 is in the transparent state and the target part where it is not in the scattering state have a small scattering property to have a brightness at a level L1 shown by broken lines 62 and 65.

At the target part where the liquid crystal layer 18 is in the scattering state, the brightness is at a high level Lm as shown by a broken line 66 because of its scattering property. Since the subject can not be recognized at the background part which is brighter than the light from the subject, it is preferable that the level L1 at the background part is as low as possible and the level Lm at the target part is moderately high.

Therefore, it is preferable to provide a light intensity change function for changing the intensity of light of the light source part 27 in accordance with the environment where the liquid crystal display device is used.

In this second embodiment, it is attained by changing electric power applied to the light source part 27.

Next, the effectiveness of the invention is explained using FIG. 11. Incidentally, portions in FIG. 11 which is the same as those in FIG. 9 are assigned the same numerals and symbols, in which the liquid crystal molecule 80 and the transparent solid substance 84 shown in FIG. 9 are quoted. However, in the liquid crystal layer 18 of the second embodiment, a part to which no voltage is applied is a transparent part 18a, and a part to which voltage is applied is a scattering part 18b.

The liquid crystal layer 18 is composed of schematically bar-shaped liquid crystal molecules 80, and transparent solid substances 84 having a schematically porous body made of an acrylic resin existing around the liquid crystal molecules 80. The liquid crystal molecule 80 has a refractive index ne corresponding to extraordinary light and a refractive index no corresponding to ordinary light.

The transparent state and the scattering state of the liquid crystal layer (mixed liquid crystal layer) 18 are generated by a differential between a refractive index np of the solid substance 84 and the refractive index no or ne of the liquid crystal molecule, and alignment properties of the liquid crystal molecules (directions and ununiformity of the liquid crystal molecules).

In this embodiment, PNM-157 mixed liquid crystal manufactured by Dainippon Ink and Chemicals, Inc. is used as a raw material of the liquid crystal layer, and further liquid crystal polymers are mixed in the transparent solid substances. The gap between the first substrate and the second substrate of the liquid crystal display panel is filled with the mixed liquid, crystal, and then the mixed liquid crystal is irradiated with ultraviolet light having a wavelength of 360 nanometers (nm) or longer for 60 seconds at a strength of 50 mW/cm$^2$ in a condition where voltage is applied thereto to produce the liquid crystal layer.

As for the refractive indices of the liquid crystal layer 18, no=1.5 and ne=1.7, and the refractive index np of the transparent solid substance is about 1.5 (almost equal to no). Further, the liquid crystal molecule 80 is aligned where no voltage is applied thereto. As for the directions of the liquid crystal molecules 80 when the voltage is small, the liquid crystal molecules 80 point in directions to have a small difference in refractive index with respect to the transparent solid substances 84 because of a large alignment compelling force by the liquid crystal polymers, in other words, the long axes (refractive indexes ne) point in a direction from the first substrate to the second substrate. Since the incident light through the first substrate 1 is a circularly polarized light parallel to the direction of the refractive index no of the liquid crystal molecule 80, the difference in refractive index at the interface between the transparent solid substance 84 and the liquid crystal molecule 80 is small, and thus the interface reflection is hardly generated, resulting in the transmission state. Therefore, the subject incident light 51 passes therethrough with hardly scattered to be a strong outgoing light toward the observer.

Since a strong compelling force by an electric field is exerted on the directions of the liquid crystal molecules 80 when the voltage is large, an alignment regulating force between the liquid crystal molecules 80 and the liquid crystal polymers is defeated by the electric field. Therefore, the liquid crystal molecules 80 lose their alignment properties to point in various directions, which generates the interface reflections between the refractive indices ne of the liquid crystal molecules and the refractive indices np of the transparent solid substances to the incident light. Therefore, a plurality of micro interface reflections are generated between the liquid crystal molecules 80 and the transparent solid substances 84, resulting in the scattering state. Accordingly, the subject incident light 52 is scattered to be a weak outgoing light toward the observer.

The emitted light 53 from the light source part 27 is a circularly polarized light 75 with little polarization. The representative components of the circularly polarized light is assumed to be an X-axis direction polarized light component (first polarized light component) 76 and a Y-axis direction polarized light component (second polarized light component) 77.

In the transparent part 18a (the background part and the target part to which no voltage is applied) of the liquid crystal layer 18, the directions of the refractive indices ne of the liquid crystal molecules 80 are aligned with a direction from the first substrate to the second substrate by the liquid crystal polymers. Therefore, incidence of light tilted, at the interfaces between the liquid crystal molecules 80 and the transparent solid substances 84, from the directions of the refractive indices ne of the liquid crystal molecules 80 slightly generates reflections at the interfaces between the liquid crystal molecules 80 and the transparent solid substances 84. As a result, the scattered light 56 is slightly generated and goes out toward the observer.

In the scattering part 18b corresponding to the target electrode 5 to which voltage is applied, the directions of the refractive indices ne of the liquid crystal molecules 80 point in various directions because of decreases in the alignment properties of the liquid crystal molecules 80. Therefore, the incident light is made incident in the directions of the refractive indices ne of the liquid crystal molecules 80, generating a number of interface reflections between the liquid crystal molecules 80 and the transparent solid substances 84, into a scattered state to be the scattered light 55 and a strong outgoing light toward the observer.

This case is simple because only the light source part 27 is required to provide around the liquid crystal display panel (the collimate lens 43 is preferably provided but not essential). However, when the light incident on the mixed liquid crystal layer 18 from the light source part 27 is tilted from the mixed liquid crystal layer 18 toward the first substrate 1 side or the second substrate 2 side, scattering occurs in the transmission part (back ground part), which is a noise to the subject incident light to decrease the visibility of the subject as compared to the case where the polarization separating device is provided. Therefore, it is preferable that the collimate lens 43 is provided to make the light from the light source part 27 a collimated luminous flux and to let it enter the liquid crystal display panel.

Further, in the second embodiment, the explanation is made using, as the liquid crystal layer 18, the liquid crystal layer (mixed liquid crystal layer) which is in the transparent state where no voltage is applied thereto and becomes the scattering state by increasing the applied voltage. However, the same effect as that of this embodiment can be attained even if the polarization separating device is omitted in the first embodiment using the liquid crystal layer which becomes the scattering state where no voltage is applied thereto.

Figure 12:
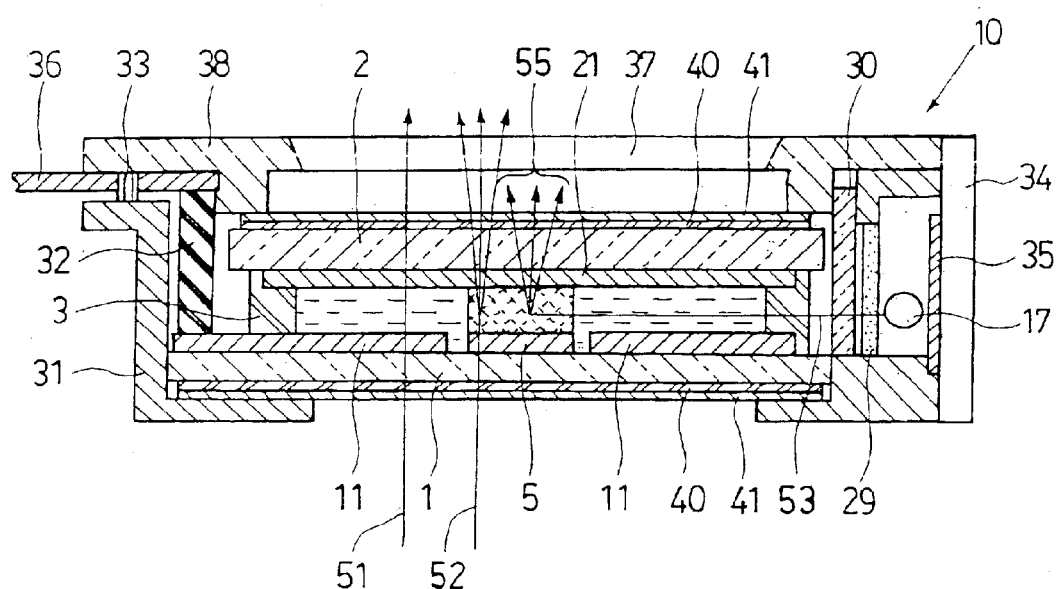
FIG. 12 is a schematic cross-sectional view, similar to FIG. 7, of a camera module showing a third embodiment of the liquid crystal display device according to the invention.
Figure 13:
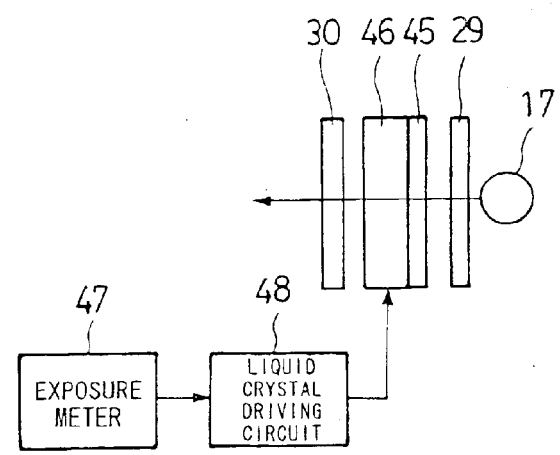
FIG. 13 is a block diagram showing one example of light intensity change means thereof.

Third embodiment: FIG. 12 and FIG. 13

Next, the third embodiment of the liquid crystal display device according to the invention is explained with reference to FIG. 12 and FIG. 13.

FIG. 12 is a schematic cross-sectional view, similar to FIG. 7, of a camera module in which the liquid crystal display device is installed, in which the same portions as those in FIG. 7 are assigned the same numerals and the explanation thereof is omitted.

The liquid crystal display device of the third embodiment has a structure almost in common with that of the liquid crystal display device of the first embodiment.

The third embodiment is different from the first embodiment in that a cold-cathode tube (fluorescent tube) is disposed as a light source part 17, in place of the LED, to be parallel to one side surface of the liquid crystal display panel, a reflection type polarizer is used as a polarization separating device 30, and that a reflector 35 is provided around the light source part 17.

The reflection type polarizer is a polarizer having as polarization axes a transmission axis and a reflection axis substantially perpendicular to the transmission axis to reflect a light linearly polarized to the direction of the reflection axis. As the reflection type polarizer, DBEF (trade name) manufactured by 3M Company is used.

A ray emitted from the light source part 17 is finally brought into a linearly polarized light by the polarization separating device 30 to enter the liquid crystal display panel.

By employing the above-described structure, the light from the light source part 17, as shown in FIG. 12, is made light whose polarization is cancelled by a diffuser 29 to enter the polarization separating device 30 which is the reflection type polarizer. Then, the light becomes a linearly polarized light in the direction of the transmission axis of the reflection type polarizer to enter a first substrate 1, a second substrate 2 and a liquid crystal layer 18 which constitute the liquid crystal display panel.

Recognition of a subject by the incident light and incident light from behind the first substrate 1, and display operations of a target pattern are the same as in the case of the first embodiment, and thus the explanation thereof is omitted.

Since the reflection type polarizer is employed as the polarization separating device 30 in the third embodiment, light passing through the reflection type polarizer is emitted as a linearly polarized light to the liquid crystal display panel, whereas a component of light not passing therethrough is reflected by the reflection type polarizer to be returned to the diffuser 29, losing its polarization and being diffused, to return in a direction of the light source part 17. Since the reflector 35 is provided near the light source part 17, the light is reflected by the reflector 35 and passes again through the diffuser 29 to reach the polarization separating device 30, and a part thereof passes through the polarization separating device (reflection type polarizer) 30 to be a linearly polarized light and goes out to the liquid crystal display panel.

In other words, absorption of light in the polarization separating device 30 is little, which enables the light emitted from the light source part 17 to enter the liquid crystal display panel efficiently.

Further, on the outside surfaces of the first substrate 1 and the second substrate 2 of the liquid crystal display panel, ultraviolet cutting layers 41 are provided respectively to prevent deterioration of the liquid crystal layer 18 due to a subject incident light from below (lens side of) the first substrate 1 and light from above (eyepiece side of) the second substrate 2 entering the liquid crystal layer 18.

Because irradiation of light having a wavelength shorter than 380 nanometers (nm) generates a decrease in scattering property, a change in voltage for causing a change into the transparent state, and yellowing in the liquid crystal layer 18, the provision of the ultraviolet cutting layers 41 is important to secure reliability.

Further, since the lens and the like are provided on the observer side of the liquid crystal display panel, anti-reflection layers 40 are provided under the above-described ultraviolet cutting layers 41 respectively to prevent the outgoing light from the scattering part of the liquid crystal display panel from returning again to the liquid crystal display panel by reflection by the lens and the like and being reflected by the second substrate 2. This can further improve recognition of the subject incident light.

The anti-reflection layer 40 preferably decreases reflection within a wavelength region from 380 nanometers (nm) to 800 nanometers (nm) which is a wavelength range of the light emitted from the light source part 17.

Furthermore, since the reflection type polarizer is used as the polarization separating device 30, it is preferable to insert an absorption type polarizer between the reflection type polarizer and the liquid crystal display panel in order to prevent a stray light of the subject incident light from being reflected by the reflection type polarizer while the light source part 17 is turned off.

In this case, the reflection type polarizer and the absorption type polarizer are preferably set with directions of their transmission axes matched, and actually the absorption type polarizer is bonded on the reflection type polarizer with an adhesive layer to constitute the polarization separating device 30.

FIG. 13 is a view showing one example of means for automatically controlling the intensity of light incident on the liquid crystal display panel from the light source part 17 in accordance with the intensity of incident light from behind the liquid crystal display panel.

A polarizer 45 and a liquid crystal cell 46 are inserted between the light source part 17 and the polarization separating device 30 to constitute, together with the polarization separating device 30, a liquid crystal shutter, and a detection signal of an exposure meter 47 is inputted into a liquid crystal driving circuit 48 for driving the liquid crystal cell.

The exposure meter 47 measures the intensity of incident light on the first substrate 1 side of the liquid crystal display panel and inputs a signal corresponding to the intensity of light into the liquid crystal driving circuit 48. This causes the liquid crystal driving circuit 48 to change the voltage applied between opposed entire surface electrodes of the liquid crystal cell 46 in accordance with the intensity of incident light. This changes optically rotating operations of a twisted nematic liquid crystal layer filling the liquid crystal cell to change the intensity of light passing through the polarizer 45 and the polarization separating device 30.

Moreover, as for the light source parts provided in the liquid crystal display device according to the invention, when the display area of the liquid crystal display panel is large, a plurality of the light source parts are provided therearound. Each emitted light is used to enable uniform illumination of the large area. Further, a plurality of light source parts for emitting light in different optical wavelength regions are provided, or a plurality of light emitting elements for emitting light in different optical wavelength regions are provided in one light source part, and they are selectively used, which also makes it possible to select white illumination, red-green-blue illumination, or the like.

The optical wavelength used for illumination is preferably within a range from 380 nanometers (nm) to 800 nanometers (mn).

Moreover, as for the period during which the light source part is turned on, the light source part is not preferably always turned on but selectively turned on by selection by the observer, in accordance with the brightness of the environment where the liquid crystal display device is used, or the strength of the subject incident light, and enabling the lighting period to be also selected. As a result, the electric power consumed by the liquid crystal display panel can be decreased to increase battery life, which results in a commercial product friendly to the earth's environment.

In the above-described embodiments, the liquid crystal layers of the first embodiment and the third embodiment are of a mode showing the scattering state while no voltage is applied thereto, and that of the second embodiment is of a mode showing the transparent state while no voltage is applied thereto. However, even if the liquid crystal layer of the mode showing the transparent state while no voltage is applied thereto is used in the first embodiment and the third embodiment, the same effects can be attained. Further, a dichroic dye may be mixed in the liquid crystal layer to increase absorption characteristics.

Figure 14:
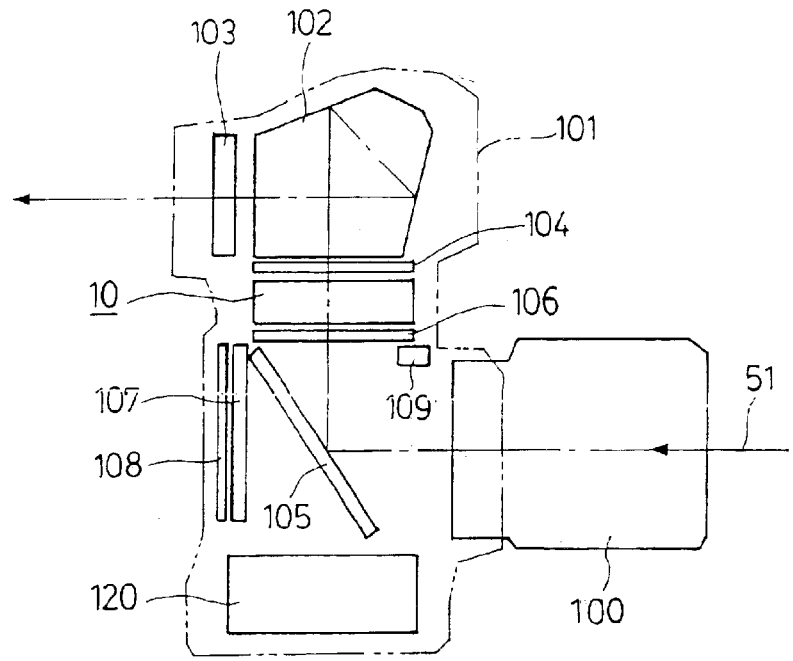
FIG. 14 is a side view showing a state in which the camera module that is the embodiment of the liquid crystal display device according to the invention is installed in a camera, viewing through a camera body.
Figure 15:
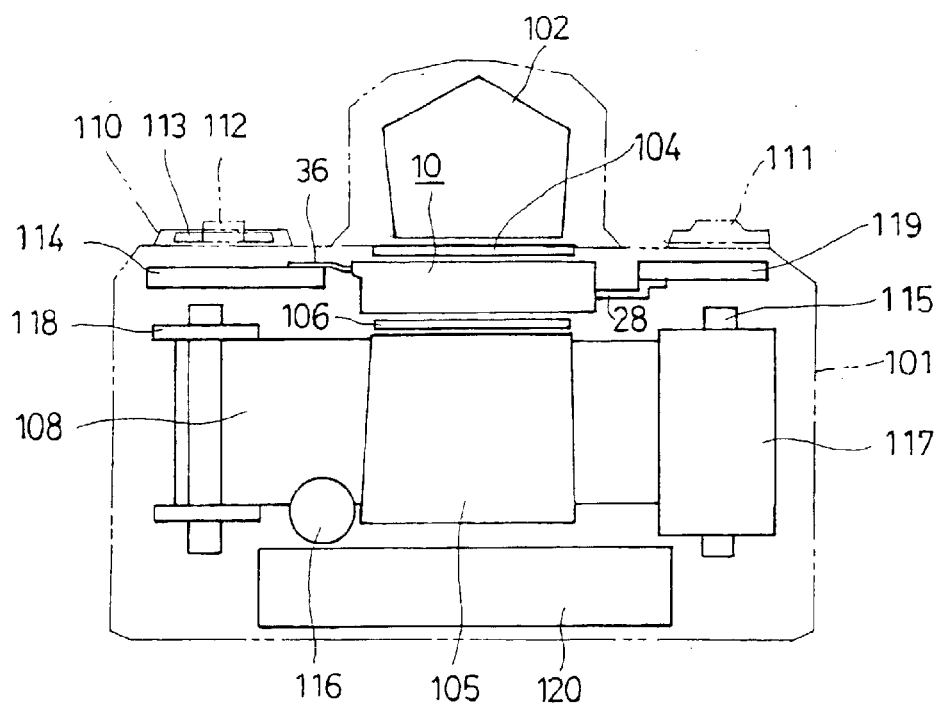
FIG. 15 is a front view showing the same without its photographing lens.
Figure 8:
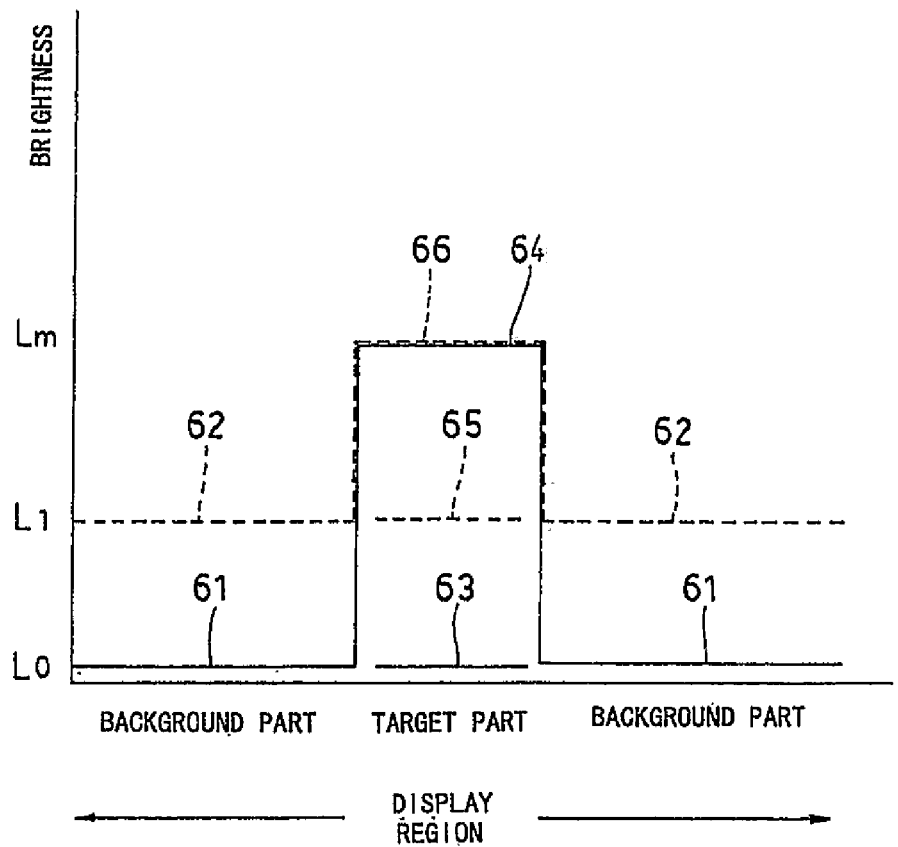

Embodiment Installed in a Camera: FIG. 14 and FIG. 15

Hereinafter, the embodiment in which the camera module that is the liquid crystal display device according to the invention is installed in a finder optical system is explained with FIG. 14 and FIG. 15.

A camera module 10 that is the liquid crystal display device according to the invention is installed between a finder lens 104 and a finder screen 106 in a camera body 101. A roof prism 102 is disposed on a finder eyepiece window lens 103 side of the finder lens 104, so that an observer of the camera looks into from the finder eyepiece window lens 103 to observe a subject.

On a photographing lens 100 side of the finder screen 106, there is a mirror 105 to let a subject incident light 51 from the photographing lens 100 go out toward the finder screen 106. There are a shutter curtain 107 and a film 108 on the opposite side to the photographing lens 100 with respect to the mirror 105. Further, at the lower side of the camera body 101, a battery 120 is provided to drive the liquid crystal display panel and the like.

Further, as shown in FIG. 15, the camera body 101 has a shutter button 112 for opening/closing the shutter curtain 107, and a power source switch 113. Furthermore, this camera is of such a system that the film 108 is loaded in a cartridge (patrone) 117 in the camera body 101, the cartridge 117 is held on a coupling shaft 115 for cartridge, and the other side of the film 108 is wound on a spool 118. Further, the camera has a motor 116 for automatically adjusting a focus of the lens and the like. Numeral 114 denotes a first circuit board, and numeral 119 denotes a second circuit board.

Connection between the position of the target pattern and the autofocus adjustment position of the camera is manually set by the observer by means of a focus setting dial 110 disposed around the power source switch 113.

By employing the above-described structure of the camera, the visibility of the target pattern can be improved even when the focus is adjusted on a part of the subject. Further, a display can be performed without disposing a polarizer, which attenuates light of the subject incident light 51, between the photographing lens 100 and the finder eyepiece window lens 103, and thus the visibility of the subject can be improved. Furthermore, even when the subject incident light 51 is dim, the visibility of the target pattern 5 can be improved by using the incident light from the light source part 27 disposed in the lateral direction of the liquid crystal display panel and the scattering property of the liquid crystal layer 18.

Moreover, as described above, the polarization separating device 30 is disposed between the liquid crystal display panel and the light source part (side light) 27 which are provided in the camera module 10, whereby the incident light from the light source part 27 is reflected from the first substrate 1 side or the second substrate 2 side so that an area other than the target pattern brightly shines by the light from the light source part 27. In other words, noise to the subject incident light 51 can be extremely decreased. Further, since the polarization separating device 30 is in a film shape, the polarization separating device 30 with a thickness of 200 micrometers ($\mu$m) or less is sufficiently effective, thus the mounting volume can be extremely decreased. In the case of camera, since optical components and electronic components are arranged near the prism 102, space is limited. Further, they determine the design of the camera, and therefore it is very effective that the mounting volume of the polarization separating device 30 is small.

Industrial Applicability

As is clear from the above explanation, through use of the present invention, while the incident light from below the first substrate is being observed, when the environment where the liquid crystal display device is used is dark, the incident light is weak, or the scattering display is hard to recognize, the outgoing light from the scattering part of the liquid crystal display panel is added, using the light source part provided around the liquid crystal display panel, to the incident light from below the first substrate to perform a display, whereby the visibility of the scattering display can be improved.

It is difficult for the observer to distinguish luminosity but the observer has sensibility of color discrimination, and therefore when strong green light is incident from below the first substrate, red light is made incident from the light source part to perform a display in red on the liquid crystal display panel, thereby improving the visibility of the display.

Further, the pixel part and the background part are provided, which are composed of the signal electrode and the counter electrode capable of performing a display in which almost the entire surface of the liquid crystal layer used for the liquid crystal display panel is in the transparent state. The pixel part and the background part are provided adjacent, which makes it possible to bring almost the entire surface into the transparent display.

Further, the scattering type liquid crystal layer changeable between the transmission state and the scattering state by voltage is employed for the liquid crystal layer. Since the employment of the scattering type liquid crystal layer enables a display without using a polarizer, the transmittance of the liquid crystal display panel can be improved.

Therefore, the condition below the first substrate can reappear in a part other than the pixel part performing a display.

Further, the liquid crystal layer is a display body without light emission, and thus when the external environment is dark, the pixel part displayed by the liquid crystal display panel becomes extremely hard to recognize.

Moreover, the light source part (side light) is disposed around the liquid crystal display panel to secure the visibility of the condition below the first substrate, and further almost the entire liquid crystal display panel other than the display pixel part is brought into the transparent state, which makes it possible to introduce the light from the light source part to the entire display area through use of the reflection due to the difference in refractive index between the first substrate and the air layer, and the reflection due to the difference in refractive index between the second substrate and the air layer.

Further, since the transparent state and the scattering state are changed by the differential in refractive index between the liquid crystal molecule and the polymer, a weak scattering property is exhibited even in the transparent state depending on the direction of the liquid crystal molecule and the direction of the light from the light source part. Therefore, in order to control the polarization of light with respect to the direction of the liquid crystal molecule, the polarization separating device is provided between the light source part (side light) and the liquid crystal display panel.

The polarization separating device can control the polarization of the light source part by the absorption type polarizer having the transmission axis and the absorption axis, the reflection-type polarizer having the transmission axis and the reflection axis, or a diffraction grating.

Especially when the scattering property of the transparent part is decreased, the transmission axis of the polarization separating device is disposed in the direction substantially perpendicular to the direction of the refractive index of the liquid crystal that is a direction in which the difference between the refractive index of the polymer and the refractive index of the liquid crystal is small, so that the polarized light passing through the polarization separating device is made incident only in a direction in which the difference in refractive index between the polymer and the liquid crystal is small, thereby decreasing scattering. The liquid crystal shows the scattering state when voltage is not applied to the pixel part and becomes transparent state when voltage is applied thereto. During the transparent state, the direction of no of the liquid crystal layer is parallel to the direction of the first substrate and the second substrate.

For example, when a liquid crystal having a refractive index (no) in the direction of ordinary light larger than a refractive index (ne) in the direction of extraordinary light that is the opposite property of the refractive index explained with reference to FIG. 9 is used and a polymer (transparent solid substance) having no alignment property in directions of three dimensions is employed as the polymer, since the refractive index of the transparent solid substance is close to ne, the transmission axis of the polarization separating device is disposed in a direction perpendicular to the direction of no. In other words, it is preferable to arrange the direction of ne and the transmission axis of the polarization separating device in parallel.

Further, the intensity of light of the light source part which reaches the liquid crystal display panel decreases in the case where the polarization separating device is simply disposed between the liquid crystal display panel and the light source part as compared to the case where the polarization separating device is not provided.

Therefore, the reflection type polarizer is used as the polarization separating device to emit a linearly polarized light, and the reflected component, its polarization being cancelled, is returned again to the reflection type polarizer, thereby improving the efficiency of emitting light.

When the strength of the light incident from below the first substrate constituting the liquid crystal display panel is low, the light of the light source part (side light) provided around the liquid crystal display panel is slightly reflected toward the observer from the transparent part of the liquid crystal display panel to interfere the visibility of the light going out from the first substrate, and thus the light intensity change function is provided to decrease the brightness of the light source part.

The light intensity change function employs one or both of means for changing electric power supplied to the light source part and means for changing light emission period.

Further, when the strength of the light incident from below the first substrate constituting the liquid crystal display panel is low, the light of the light source part (side light) provided around the liquid crystal display panel is slightly reflected toward the observer from the transparent part of the liquid crystal display panel to interfere the visibility of the light going out from the first substrate, and thus the polarization separating device is used to change the intensity of the light incident on the liquid crystal display panel from the light source part.

The transmission axis of the polarization separating device on the liquid crystal display panel side is fixed, and polarized light separating means and the polarization separating device are provided on the light source part side. Since the application of voltage to the polarized light separating means can control the polarizing property of the polarized light separating means, the intensity of light incident to the liquid crystal display panel can be changed.

As the polarized light separating means, the liquid crystal display panel may be used, and the polarization separating device may be a polarizer.

In the above-described embodiments, the explanation is made using a camera as a device for which the liquid crystal display device is used, and the liquid crystal display device is naturally applicable to a device for performing a display combining the incident light from below the first substrate and the incident light from the light source part. For example, that is a display device overlapped a front glass of a car, a timepiece for performing a time display on a picture, or the like.

What is claimed is:

1. A camera having a liquid crystal display device as a module which is installed in a finder optical system, wherein
said liquid crystal display device is composed of a liquid crystal display panel in which a first substrate formed with a signal electrode and a second substrate formed with a single counter electrode on one surface, respectively, are coupled together, with said signal electrode and said counter electrode opposed each other, with a fixed gap provided therebetween by interposing a sealing part at an outer peripheral part of a display area, and a liquid crystal layer is provided in the gap, wherein
a finder screen is disposed outside said first substrate and a finder lens is disposed outside said second substrate of said liquid crystal display panel,
said signal electrode is composed of a surrounding electrode formed as a single body over almost the entire area of said display area, a pattern electrode isolatedly formed within said surrounding electrode with a small gap therebetween, and a wiring electrode formed across said surrounding electrode with a gap provided between said wiring electrode and said surrounding electrode in order to selectively apply voltage to said pattern electrode, wherein said pattern electrode is a target electrode for displaying a target pattern for autofocus,
said counter electrode is provided over the entire area of said display area to face said signal electrode,
said first substrate, said second substrate, said signal electrode and said counter electrode are all transparent,
said liquid crystal layer is a scattering type liquid crystal layer which changes in transmittance and scattering rate depending on existence or absence of application of voltage by means of said signal electrode and said counter electrode, in which scattering degree increases in a part to which voltage is not applied and transparency increases in a part to which voltage is applied,
said small gap is made small in width so that scattering at said small gap is inconspicuous when most of display region becomes transparent by applying voltage between said signal electrode and said counter electrode and when said target pattern is displayed without applying voltage between said target electrode and said counter electrode,
said wiring electrode is made small in width so as to be inconspicuous when said target pattern is displayed without applying voltage between said target electrode and said counter electrode, and
a light source means which emits linearly polarized light is disposed outside a peripheral part of said liquid crystal display panel, and at least a part of said sealing part facing said light source means has a light transmitting property to allow linearly polarized light emitted from said light source means to pass through said sealing part and enter said liquid crystal layer.

2. A camera having a liquid crystal display device according to claim 1, wherein
said liquid crystal display panel, in which an outside of said second substrate is a visible side, always presents a condition outside said first substrate to the visible side,
a luminosity of a scattering part, where the transparency does not increase, of said liquid crystal layer becomes higher than luminosities of other parts while a light source part of said light source means is turned on, and the luminosity of said scattering part of said liquid crystal layer becomes lower than the luminosities of the other parts while said light source part is turned off.

3. A camera having a liquid crystal display device according to claim 1, wherein
said light source means comprises a light source part and a polarization separating device disposed between the light source part and an outer peripheral part of said liquid crystal display panel.

4. A camera having a liquid crystal display device according to claim 3, wherein
an optical means composed of a convex lens is provided between said light source part of said light source means and said polarization separating device.

5. A camera having a liquid crystal display device according to claim 3, wherein
said scattering type liquid crystal layer of said liquid crystal display panel is a mixed liquid crystal layer composed of transparent solid substances and a liquid crystal, which is produced by applying ultraviolet light to liquid composed of liquid crystal and organic monomers, and
said polarization separating device is disposed so that a transmission axis thereof almost matches with a direction in which a difference between a refractive index of said transparent solid substance and a refractive index of said liquid crystal of said mixed liquid crystal layer is small.

6. A camera having a liquid crystal display device according to claim 5, wherein
said polarization separating device is an absorption type polarizer having a transmission axis and an absorption axis substantially perpendicular to the transmission axis.

7. A camera having a liquid crystal display device according to claim 5, wherein
said polarization separating device is a reflection type polarizer having a transmission axis and a reflection axis substantially perpendicular to the transmission axis.

8. A camera having a liquid crystal display device according to claim 7, wherein
a diffuser is provided between said polarization separating device and said light source part, and a reflector is provided around said light source part.

9. A camera having a liquid crystal display device according to claim 5, wherein
said polarization separating device is composed of an absorption type polarizer having a transmission axis and an absorption axis substantially perpendicular to the transmission axis, and a reflection type polarizer having a transmission axis and a reflection axis substantially perpendicular to the transmission axis, and said absorption type polarizer is disposed on said liquid crystal display panel side and said reflection type polarizer is disposed on said light source part side respectively with directions of the respective transmission axes of said absorption type polarizer and said reflection type polarizer matching with each other.

10. A camera having a liquid crystal display device according to claim 3, wherein
light intensity change means which controls increase and decrease of an intensity of light to make incident on said liquid crystal display panel in accordance with an intensity of light incident on said liquid crystal display panel from outside said first substrate is provided in said light source means.

11. A camera having a liquid crystal display device according to claim 10, wherein
said light intensity change means comprises a liquid crystal cell provided between said polarization separating device and the light source part, a polarizer arranged on a light source part side of the liquid crystal cell, an exposure meter for detecting the intensity of the light incident from outside said first substrate, and a liquid crystal driving circuit for changing voltage applied to said liquid crystal cell in accordance with an output from said exposure meter.

12. A camera having a liquid crystal display device according to claim 5, wherein
an ultraviolet cutting layer is provided at least on one of outer surfaces of said first and second substrates of said liquid crystal display panel.

13. A camera having a liquid crystal display device according to claim 5, wherein
an anti-reflection layer for preventing reflection of light within a wavelength range of light emitted by said light source part is provided at least on one of outer surfaces of said first and second substrates of said liquid crystal display panel.

14. A camera having a liquid crystal display device according to claim 3, wherein
said light source part comprises a plurality of light emitting elements which can selectively emit lights in different optical wavelength regions.

15. A camera having a liquid crystal display device according to claim 3, wherein
said light source part can selectively emit light in different optical wavelength regions in accordance with brightness of environments or strength of incoming light, and the period in which said light source part is turned on can be selected.

16. A camera having a liquid crystal display device according to claim 1,
wherein said liquid crystal display device is a module comprising a panel holding frame and a panel fixing frame, installed in a finder optical system of a camera, and a gap between said panel holding frame, said panel fixing frame, and said liquid crystal display panel installed in said frames is filled with a heat insulating seal.

17. A camera having a liquid crystal display device according to claim 1,
wherein a width of said small gap and a width of said wiring electrode is about 3 $\mu$m respectively.

18. A camera having a liquid crystal display device according to claim 3,
wherein said light source part is composed of a light emitting diode for emitting red light.

* * * * *

UNITED STATES PATENT AND TRADEMARK OFFICE
CERTIFICATE OF CORRECTION

PATENT NO. : 6,847,428 B1  Page 1 of 2
APPLICATION NO. : 09/926803
DATED : January 25, 2005
INVENTOR(S) : Sekiguchi et al.

It is certified that error appears in the above-identified patent and that said Letters Patent is hereby corrected as shown below:

DELETE DRAWING SHEET 5 AND SUBSTITUTE THEREFORE THE DRAWING SHEET CONSISTING OF FIG. 8 AS SHOWN ON THE ATTACHED PAGE.

Signed and Sealed this

Twenty-third Day of October, 2007

JON W. DUDAS
*Director of the United States Patent and Trademark Office*